United States Patent [19]

Anderson et al.

[11] Patent Number: 4,941,313

[45] Date of Patent: * Jul. 17, 1990

[54] HUMANE TRAINING AID WITH ADJUSTABLE MUZZLE LOOP HAVING AN ADJUSTABLE LOCKING DEVICE

[75] Inventors: Robert K. Anderson, Roseville; Ruth E. Foster, Minneapolis; Bertyl W. Carlson, Richfield, all of Minn.

[73] Assignee: Regents of the University of Minnesota, Minneapolis, Minn.

[*] Notice: The portion of the term of this patent subsequent to Nov. 11, 2003 has been disclaimed.

[21] Appl. No.: 223,157

[22] Filed: Jul. 22, 1988

Related U.S. Application Data

[60] Continuation-in-part of Ser. No. 169,294, Mar. 17, 1988, which is a division of Ser. No. 922,157, Oct. 23, 1986, Pat. No. 4,741,288, which is a continuation-in-part of Ser. No. 719,692, Oct. 4, 1985, Pat. No. 4,621,591.

[51] Int. Cl.$^5$ .................................................. B68B 1/02
[52] U.S. Cl. ........................................................ 54/24
[58] Field of Search ............... 119/105, 106, 109, 129, 119/130, 132, 153; 54/1, 15, 24, 34, 85; 24/135 N, 135 R

[56] References Cited

U.S. PATENT DOCUMENTS

| | | | |
|---|---|---|---|
| 236,557 | 1/1881 | Covert | 24/135 N |
| 538,075 | 4/1895 | Herrberg | 24/135 N |
| 1,057,484 | 4/1913 | Huber | 24/135 N |
| 1,559,574 | 11/1925 | McMillan | 24/135 N |
| 2,429,448 | 10/1947 | Bakke | 24/135 N |
| 4,019,463 | 4/1977 | Kitchen | 119/109 |
| 4,566,255 | 1/1986 | DeGroot | 119/130 X |
| 4,621,591 | 11/1986 | Anderson et al. | 119/130 |
| 4,662,035 | 5/1987 | Hatfield | 24/135 R |
| 4,741,288 | 5/1988 | Anderson et al. | 119/130 |

FOREIGN PATENT DOCUMENTS

A-2284063 4/1976 France.
A-2434988 3/1980 France.

*Primary Examiner*—Gene Mancene
*Assistant Examiner*—R. Thomas Price
*Attorney, Agent, or Firm*—Kinney & Lange

[57] ABSTRACT

A humane training aid comprising a collar loop and a muzzle loop that are mounted together to permit placement onto an animal such as a dog where the muzzle loop is slideably mounted through a ring held by the collar loop at the rear of the lower jaw and against the neck of the dog. The muzzle loop is placed over the muzzle of the animal. In order to make the humane training aide work effectively, the muzzle loop is made so that it closely fits the muzzle and has a portion that is positioned on the lower side of the ring held by the collar to which a leash can be attached so that upon applying a pulling force on the muzzle loop, the loop and the collar will provide pressure against the muzzle and neck of the animal to provide a calming effect and control. An adjustable slide-lock device is used to quickly adjust the muzzle loop. The slide-lock device has universal applications for adjusting loop sizes for various uses.

6 Claims, 2 Drawing Sheets

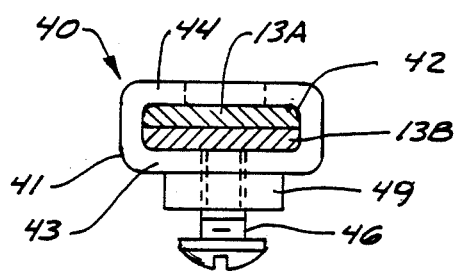
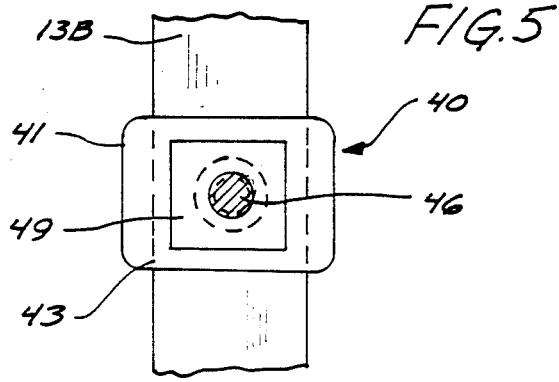
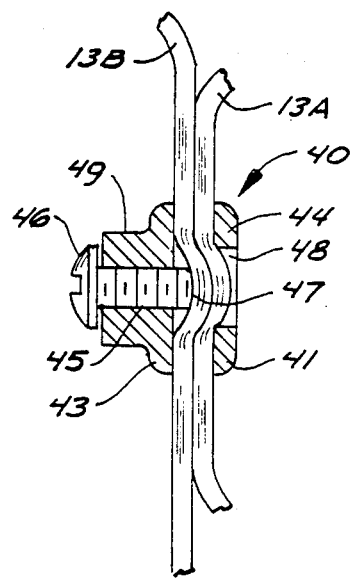
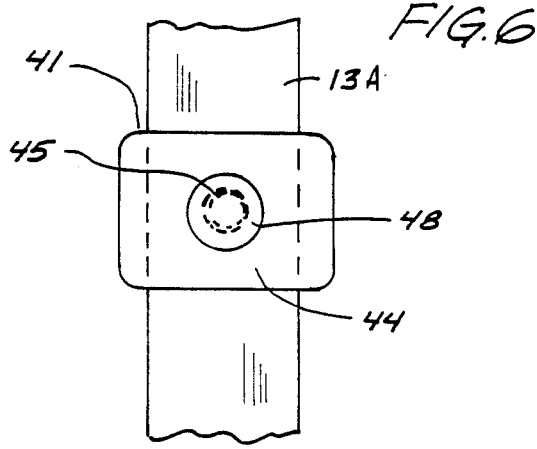

HUMANE TRAINING AID WITH ADJUSTABLE MUZZLE LOOP HAVING AN ADJUSTABLE LOCKING DEVICE

CROSS REFERENCE TO RELATED APPLICATION

This application is a continuation in part of a co-pending application Ser. No. 07/169,294, filed Mar. 17, 1988, which was a division of application Ser. No. 06/922,157, filed Oct. 23, 1986, now U.S. Pat. No. 4,741,288 which in turn was a continuation in part of application Ser. No. 06/719,692, filed Oct. 4, 1985, U.S. Pat. No. 4,621,591.

BACKGROUND OF THE INVENTION

1. Field of the Invention.

The present invention relates to adjustable muzzle loops for use with training aides for animals, and also relates to an adjustable slide-locking device used for adjusting the size of a loop.

2. Description of the Prior Art.

Combination collars and muzzle humane training aids are shown in U.S. Pat. No. 4,621,591 issued in November 1986 to Anderson et al., and U.S. Pat. No. 4,741,288 issued May 3, 1988 to the same inventors. In these patents a humane training aid of the type disclosed herein is provided, and the teaching of using a collar loop and a muzzle loop is disclosed. It is also disclosed that the muzzle loop should closely fit over the muzzle of the dog or other animal on which the humane training aid is used, and this requires a range of different sizes of the closed muzzle loop. In U.S. Pat. No. '288 a snap fastener loop is disclosed for providing some adjustment, but the snaps provide only limited size adjustment, increase the cost of making and can at times be unsnapped by the dog wearing the training aid. The present invention provides an improved slide-locking device for adjusting the muzzle loop across a wide range of sizes, so perhaps only two or three closed loop sizes are necessary for accommodating all dogs, and individual size adjustments can be made with the slide-locking device.

There are various loop adjustment devices forming slide locks, including housing which has a screw passing through the housing and thus through or alongside the straps for clamping.

SUMMARY OF THE INVENTION

The present invention relates to a slide locking device for use with straps for adjusting the position of the slide and locking the slide in position on the strap. In particular, the slide locking device can be used on a combination collar and muzzle for adjusting the muzzle loop. The slide-locking device mounts on the exterior portion of the muzzle loop, and permits adjusting the loop precisely to fit various sized animals, particularly dogs. The combination collar and muzzle includes a collar loop that fits closely around the neck of a dog and which has a ring at the lower side thereof that is positioned immediately at the rear of the lower jaw and against the neck. The collar is conventionally adjusted for size, so that a snug fit on the neck can be obtained. The collar ring that guides the muzzle loop is preferably a divided ring that has a center bar, forming two ring-end portions. The end portions of the ring receive side strap portions of the muzle loop, which is a continuous closed muzzle loop. The muzzle loop thus has one end portion that forms a loop up over the muzzle of the animal or dog, and a lower portion that extends below the collar ring to the exterior side of the ring. The slide-locking device is on the lower or exterior loop portion and can slide along the loop and lock in position to adjustably fix the size of the loop that passes over the muzzle.

The slide-locking device is made so that a relatively snug fit can be produced around the muzzle loop, leaving a section of the muzzle loop extending below the collar ring that is held by the collar, and which can be usable for attaching leash through another ring, or with some type of a strap directly connected to the muzzle loop.

The slide-locking device is an easily manufactured molded body that has a rectangular opening to receive the two side straps of the muzzle loop. A boss is provided on one side of the body and it has a threaded opening extending through one side of the housing. A screw is threaded into this opening and can be threaded so the end of the screw portrudes into the opening carrying the muzzle loop side straps. The screw then can be made to bear against the straps to lock the slide lock in position. Preferably the opposite side wall of the housing from the screw has a through, unthreaded opening in alignment with the screw so that as the screw is tightened it will depress the two straps of the muzzle loop strap into the unthreaded opening to provide a very positive detent for holding the muzzle loop in its adjusted position.

The combination muzzle loop and collar operates as a humane training aid as explained in the previous U.S. Pat. Nos. 4,621,591 and 4,741,288.

BRIEF DESCRIPTION OF THE DRAWINGS

FIG. 3 is a sectional view of a slide locking device of the present invention;

FIG. 4 is an end view of the slide-locking device of the present invention;

FIG. 5 is a side view of the slide-locking device shown in FIG. 4; and

FIG. 6 is a plan view of the opposite side of the slide locking device from FIG. 5.

DETAILED DESCRIPTION OF THE PREFERRED EMBODIMENTS

Figure 1:
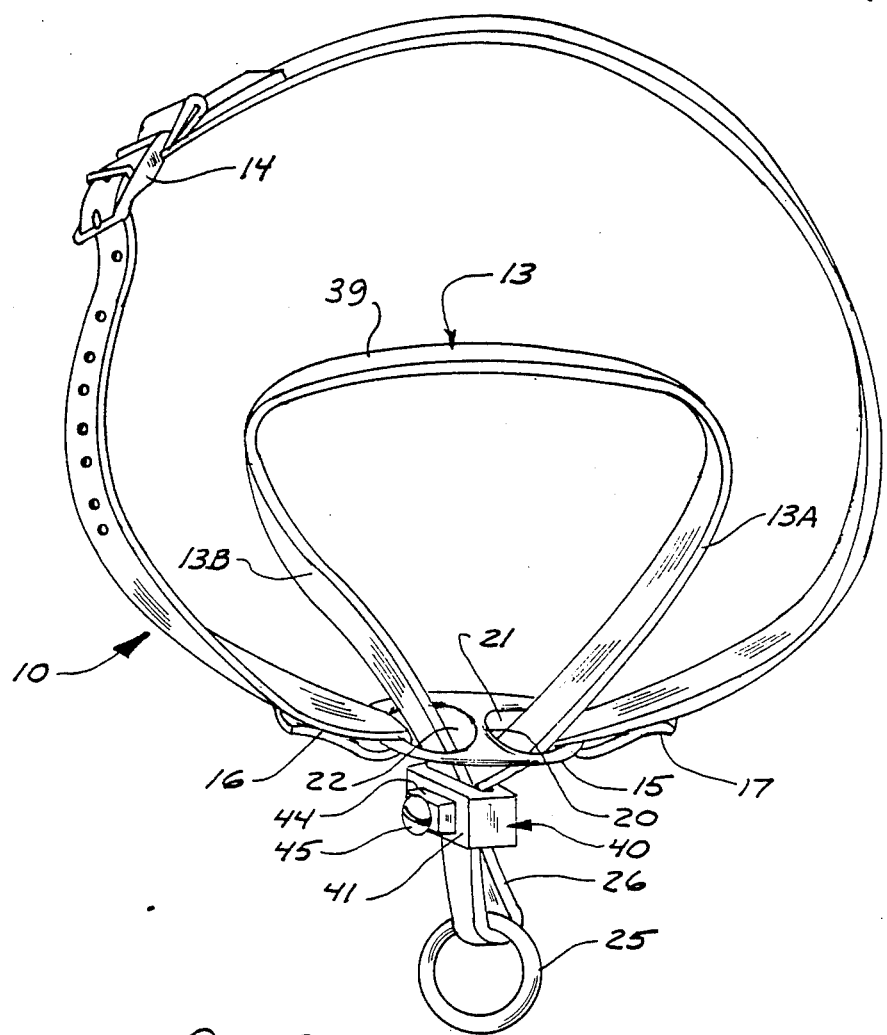
FIG. 1 is a perspective view of a combination collar and muzzle training aid having a slide-locking device for adjusting the muzzle loop in accordance with the present invention.
Figure 2:
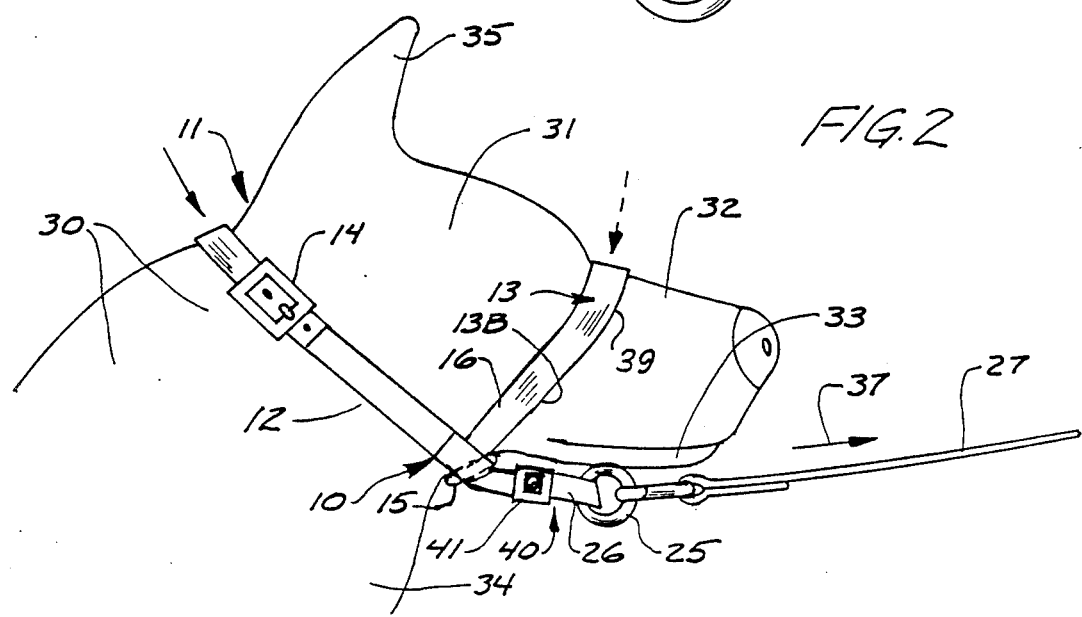
FIG. 2 is a side view of the device of FIG. 1 showing the device of FIG. 1 on a dog.

As shown in FIGS. 1 and 2, a combination collar and muzzle training aid is illustrated generally at 10 and in FIG. 2 it is shown mounted on the head and neck of a dog indicated at 11. The combination collar and muzzle loop training aid 10 includes a collar or neck loop 12, and a muzzle loop 13. An adjustable fastener 14, such as a buckle, is used with the collar loop 12 so that the size of the collar loop can be adjusted to snugly fit the neck of the dog. A connecting ring indicated generally at 15 is attached to the collar loop. As shown, the connecting ring 15 is integrally fastened to and forms part of the collar loop, and it is connected to the ends of side strap sections of the flexible collar loop shown at 16 and 17 on opposite sides of the ring 15. The ring 15 is an oval ring that has a central divider bar 20 to form two side opening 21 and 22.

The muzzle loop is a continuous, unthreaded loop that forms two side strap lengths indicated at 13A and 13B and these strap lengths slidably pass through the opposite openings 21 and 22 in the ring 15 defined on opposite sides of the divider bar 20, respectively. The straps lengths 13A and 13B are freely slidable in the two side openings 21 and 22 of the ring 15. A snap receiving ring 25 is attached to the lower portion 26 of the muzzle loop, which is the part of the muzzle loop on the lower side of the ring 15. If desired, an integrally mounted leash could be attached to this lower, exterior portion 26 of the muzzle loop, but as shown leash 27 is snapped onto ring 25, and can be pulled as shown by arrow 37.

The collar loop 12 is placed around the neck 30 of the dog and adjusted with the buckle or adjustable fastener 14 so that is fits immediately behind the jaw, and snugly fits against the sides of the neck of the dog.

The dog 11 has a head 31, a muzzle or nose 32, a lower jaw 33 and a throat 34. In installation, the adjustment of the collar places the collar snugly around the neck 30 so that the ring 15 lays flat on the bottom of the neck just above the adams apple. The collar is adjusted so it does not cause a choking force. The collar loop is placed just behind the ears 35, and extends behind the head and jaw.

There is a natural recess between the neck and the lower jaw of a dog for positioning the collar loop 12, so that the ring 15 lies properly positioned to the rear of the jaw hinge of the dog. The upper usable end portion 39 of muzzle loop 13 is looped over the muzzle 32 of the dog. The usable end portion of the muzzle loop fits immediately ahead of the eyes of the dog and is in a position so that it forms approximately a right angle with the sides of the collar loop, as shown in FIGS. 1 and 2. This is the position where the training aid is most effective, and also when positioned as shown in FIG. 2, when the muzzle loop is permitted to loosen by releasing pressure on the leash, the dog can easily open its lower jaw for panting or drinking.

The lower portion 26 of the muzzle loop has a slide locking adjustment device shown generally at 40 mounted thereon, and this is used for adjusting the usable loop portion 39 that passes over the muzzle of the dog to provide for a snug, but not overly tight fit over the muzzle. The slide-locking device 40 is adjusted along loop portion 26 to the proper location and it engages the center bar 20 of the ring 15. Thus the muzzle loop can be adjusted so that there is a different size of upper usable loop portion 39 without having to provide individual sizes.

The slide-locking device, thus increases the versatility and usability of individual, closed, continuous muzzle loops that have no snaps, buckles or other fasteners that might be released by a dog pawing or which might cause pressure points. The muzzle loop can be a strap sewn in a smooth juncton or it can be woven into a continuous loop to make a smooth surface against the muzzle of the dog. The muzzle loop preferably does not have extra thicknesses that would impede sliding through the end portions 21 and 22 of the ring 15. This insures that the action of the humane training aid will be easily obtained by pulling on the leash 27 to provide pressures along the neck and muzzle.

The slide-locking device 40 comprises of a molded outer tubular housing 41 that is of size to receive the lengths 13A and 13B of the muzzle loop, and as can be seen, housing 41 is tubular with a rectangular opening 42 defined by a first side wall 43, and a second side wall 44. The side walls are parallel and spaced apart and held together with end walls. In the form shown, the molded plastic slide-locking device 40 has a boss 49 mounted on the exterior of side wall 43.

The boss 49 has a threaded opening 45 there-through, and this opening passes through the side wall 43 as well, which receives a small pan-head nylon machine screw indicated at 46. This machine screw 46 is made so that is short enough so that it does not pass all the way through the opening to the opposite side wall 44 of the housing 41. The screw 46 has a slightly rounded end 47 that bears against the straps lengths 13A and 13B of the muzzle loop. This bearing force of the screw 46 will tighten the strap lengths against the side wall 44 to provide a friction lock for the slide-locking device.

In order to insure a positive lock, the wall 44, which is opposite from the threaded opening 45 has an opening 48 therein which is of larger size of diameter than the screw 46, or its end 47 so that the strap lengths 13A and 13B of the muzzle loop are deflected by the end 47 of the screw partially into opening 40 to provide a detent effect as shown in FIG. 3. This deflection of the fabric (woven nylon) muzzle loop straps into the opening provides a positive lock detent that securely holds the adjustment device with only a moderate amount of tightening of the screw 46. The screw 46 can be tightened with a suitable coin or a thumb nail sufficiently to provide for quick adjustment of the size of the upper usable portion of the muzzle loop. It can also be seen in FIG. 1 that the side strap lengths of the muzzle loop slide easily in the openings 21 and 22, and the slide-locking device 40 bears against the bar 20 as the muzzle loop is loosened by releasing pressure on the leash or loop section 26. The slide lock device 40 prevents the muzzle loop from changing its size once it has been adjusted to the proper size. The muzzle loop thus remains snug on the muzzle of the dog at all times, and yet the pressure for control can be quickly applied and easily applied because the loop slides easily in the ring 15.

Thus, the device of the present invention provides ease of adjustment so that a wide range of sizes can be accommodated with one collar loop and one muzzle loop size. The slide-lock device can be made into a suitable size so that perhaps three different size ranges of muzzle and collar loop training aids can be provided to accommodate most of the sizes of dogs that are presently popular companion animals.

This permits the pressure on the neck and on the muzzle, which is generally accepted as being effective to cause release of neuro-transmitters that have a calming effect on the animal, and this calming effect aids in humane control without injury to tissues, nerves or organs of the animal. The present slide-locking device can be used with the muzzle and collar loop having keeper straps along the sides, or having retainer straps going over the front of the dog's head as shown in U.S. Pat. No. 4,741,288 very effectively. This still permits very smooth sliding of the muzzle loop in the ring 15 because there are no snaps or similar adjustment devices bearing against the muzzle or sliding through the ring.

The use of the adjustable slide locking device maintains the integrity of the muzzle loop or nose loop strap, because it doesn't require opening and closing, and provides a means to adjust the of the loop portion 39 which encircles the nose and lower jaw above the ring 15.

Upon loosening the tightening screw 46 of the adjustable slide-locking device, the housing easily slides on the portion 26 of the muzzle loop that is below the ring 15, and permits for a wide range of adjustability. This adjustability is limited only by the total length of the muzzle loop strap. The ring 15, with the center bar 20 protects the skin and neck muscles from any direct contact or pressure from the adjustable slide locking device 40 when it is locked to the muzzle loop below the divider bar 20 of the ring 15.

The adjustable slide locking device 40 is easily locked or released to adjust the effective length, and when the screw is tightened against the two lengths of the muzzle loop. The locking device provides a safer means of adjusting the muzzle loop size without breaking the integrity of the muzzle loop strap and prevents the possibility that fasteners may fail. This guards against any unwanted injury to a person holding the leash should the animal being controlled break loose. Additionally, the ring 15 remains near the neck of the animal, above the Adam's apple of the animal and at the rear of the lower jaw. The slide-locking device 40, of course, can be used for adjusting any loop or strap length, and the unique idea of having an adjusting screw that pushes the strap length into an opening on the opposite side wall of the housing is applicable to a wide number of different types of straps.

What is claimed is:

1. A combination collar and muzzle humane training aid for a dog having a neck, head, eyes, a lower jaw and a muzzle extending forwardly from the eyes, said humane training aid comprising:
    an adjustable collar adapted to fit closely around the neck of a dog on which the humane training aid is placed, and to fit close to the head;
    a ring carried by such said collar, said ring being mounted at a position underneath the neck of a dog on which the adjustable collar of the training aid is mounted immediately to the rear of the lower jaw;
    a muzzle loop freely slidably passing through said ring and of size to form a loop over a muzzle and immediately adjacent and forward of, eyes of a dog on which the humane training aid is placed, said muzzle loop having a portion extending below the ring, comprising a pair of lower strap portions; and
    an adjustable lock means on the lower strap portions of the muzzle loop below the ring, said lock means including a housing receiving both of said lower strap portions, and means for affixing the strap portions to each other and for securing the lock means at a fixed location thereon, said lock means being prevented from passing through the ring, to thereby fix the size of the muzzle loop portions passing over a muzzle relative to the ring without restraining free movement of the muzzle loop as the lock means is moved away from the ring to apply pressure to a muzzle of a dog wearing the humane training aid.

2. A combination collar and muzzle humane training aid for dogs as specified in claim 1 wherein said ring has a center bar, and wherein the lower strap portions are positioned on opposite sides of the center bar, respectively, so that the center bar prevents the adjustable lock means from passing through the ring.

3. The combination collar and muzzle humane training aid for dogs according to claim 2, wherein said adjustable lock means comprises a molded plastic housing member.

4. The combination collar and muzzle humane training aid for dogs as specified in claim 1 wherein the housing comprises a pair of generally parallel walls which are spaced apart, a wall of at the housing opposite the one wall of said adjustable lock means has an aperture therethrough that is of sufficient diameter to permit a portion of the lower strap portions to be forced at least partially into the aperture under force generated by said screw.

5. The combination collar and muzzle humane training aid for dogs as specified in claim 3 wherein said aperture is of a larger diameter than said screw.

6. A head collar for a dog having a neck, head, and a muzzle comprising:
    an adjustable collar adapted to fit closely around the neck of a dog on which the head collar is placed;
    a ring carried by such collar and positioned beneath the neck of a dog and below the lower jaw;
    a muzzle loop comprising a pair of strap sections on opposite sides of the muzzle joining to form a continuous strap over the muzzle, such strap sections passing through and extending below the ring and being adapted to be coupled to the leash below a ring; and
    an adjustable lock member on the strap sections of the muzzle loop extending below the ring, said lock member being prevented from passing through the ring and having means for clamping the two strap sections together below the ring to adjust the size of the muzzle loop above the ring to a suitable size for a dog wearing such head collar, said muzzle loop being a substantially continuous strap passing over the muzzle of such dog without separable sections thereon, and said strap sections being free slidably moveable through said ring as limited to the lock member to permit exerting a force on the muzzle by pulling on the strap sections extending below the ring in portion.

* * * * *

UNITED STATES PATENT AND TRADEMARK OFFICE
CERTIFICATE OF CORRECTION

PATENT NO. : 4,941,313
DATED : July 17, 1990
INVENTOR(S) : Robert K. Anderson et al.

It is certified that error appears in the above-identified patent and that said Letters Patent is hereby corrected as shown below:

Col. 6, line 24, delete "claim 3", insert --claim 4--

Signed and Sealed this

Eighth Day of October, 1991

Attest:

HARRY F. MANBECK, JR.

*Attesting Officer*  *Commissioner of Patents and Trademarks*